(12) United States Patent
Breti et al.

(10) Patent No.: US 7,698,477 B2
(45) Date of Patent: Apr. 13, 2010

(54) METHOD AND APPARATUS FOR MANAGING FLOW CONTROL IN PCI EXPRESS TRANSACTION LAYER

(75) Inventors: Jeffrey William Breti, Nashua, NH (US); Douglas Elliott Sanders, Framingham, MA (US); Harish Bharadwaj, Redwood City, CA (US); Suparna Behera, Cupertino, CA (US); Gordon Douglas Boyd, Arlington, MA (US); Richard John Bombard, Marlborough, MA (US); Philip Waldron Herman, Jr., Carlisle, MA (US)

(73) Assignee: LSI Corporation, Milpitas, CA (US)

( * ) Notice: Subject to any disclaimer, the term of this patent is extended or adjusted under 35 U.S.C. 154(b) by 1036 days.

(21) Appl. No.: 11/290,096

(22) Filed: Nov. 30, 2005

(65) Prior Publication Data

US 2007/0121495 A1    May 31, 2007

(51) Int. Cl.
*G06F 19/00* (2006.01)
*G06F 3/00* (2006.01)
(52) U.S. Cl. .......................... 710/29; 710/33
(58) Field of Classification Search ................ 370/229, 370/231, 235, 389, 395, 437, 445; 710/107
See application file for complete search history.

(56) References Cited

U.S. PATENT DOCUMENTS 6,747,949 B1 *   6/2004  Futral ......................... 370/231
6,874,054 B2 *   3/2005  Clayton et al. ............... 710/310
7,266,083 B2 *   9/2007  Carnevale et al. ............ 370/242
7,406,092 B2 *   7/2008  Dropps et al. ................ 370/437
7,480,293 B2 *   1/2009  Betker ......................... 370/389
7,512,067 B2 *   3/2009  Dropps et al. ................ 370/230
2005/0259651 A1 * 11/2005  Yashima ....................... 370/389
2007/0133415 A1 *  6/2007  Spink .......................... 370/235

\* cited by examiner

*Primary Examiner*—Henry W. H. Tsai
*Assistant Examiner*—Cheng-Yuan Tseng
(74) *Attorney, Agent, or Firm*—Yee & Associates, P.C.

(57) ABSTRACT

A method and apparatus is provided wherein a central Credit Controller Entity (CCE) is connected to a PCIE fabric environment by means of several buses. Flow Control information sent to the CCE over two of the buses indicates the buffer storage capacity that is available at respective Receiver components in the PCIE fabric. The CCE processes the Flow Control information, to generate updates that are sent by a third bus to Transmitter components corresponding to the Receivers. In one useful embodiment, directed to a method of Flow Control management, the CCE provides a repository adapted to store credit count information that represents the available storage capacity of respective Receivers. The method further comprises routing further credit count information from a given Receiver to the CCE, for storage in the repository, following each of successive events that affect the storage capacity of the given Receiver. The CCE is operated to selectively process the credit count information stored in the repository, in order to generate an update credit count. The update credit count is then selectively sent to a given Transmitter, to enable the given Transmitter to send a transmission to the given Receiver.

13 Claims, 4 Drawing Sheets

METHOD AND APPARATUS FOR MANAGING FLOW CONTROL IN PCI EXPRESS TRANSACTION LAYER

BACKGROUND OF THE INVENTION

1. Technical Field

The invention disclosed and claimed herein generally pertains to a method for managing flow control updates in a PCI Express (PCIE) environment. More particularly, the invention pertains to a method of the above type wherein a Credit Control Entity (CCE) receives credit count information that represents available storage capacity of receivers in the PCIE environment. Even more particularly, the invention pertains to a method of the above type wherein updates, derived by the CCE from the credit count information, are used to enable transmissions to the receivers.

2. Description of the Related Art

In a PCIE fabric environment, packet traffic is directed to virtual channels (VCs) by mapping packets with traffic class labels to corresponding VCs. Moreover, PCIE provides the capability of mapping multiple traffic classes onto a single VC. This is achieved by arranging for traffic flowing through a VC to be multiplexed onto a common physical Link, from Transmitters on the transmit side of the Link. Subsequently, the traffic is de-multiplexed into separate VC paths and directed to corresponding Receivers, on the receive side of the Link.

Within a PCIE switch, each of the VCs requires dedicated physical resources, such as RAMS, buffers or queues, in order to provide buffering or storage capacity. This is necessary to support independent traffic flows inside the switch. Accordingly, a PCIE environment is provided with a Flow Control (FC) mechanism, in order to prevent overflow of Receiver storage buffers and also to enable compliance with ordering rules. The Flow Control mechanism is used by a Requestor, that is, a device originating a transaction in the PCIE domain, to track the buffer space available in a Receiver that is on the opposite side of a Link. Such tracking is carried out by means of a credit-based Flow Control procedure, designed to ensure that a packet is transmitted only when a buffer is known to be available to receive the packet at the other end. This eliminates any packet retries, as well as associated waste of bandwidth due to resource constraints. Each virtual channel maintains an independent Flow Control credit pool. Flow Control information is conveyed between two sides of a Link, by means of Data Layer Link packets (DLLP).

Flow Control is generally handled by the Transaction Layer, in cooperation with the Data Link Layer, with the Transaction Layer performing Flow Control accounting for received Transaction Layer packets (TLPs). The Transaction Layer gates a Transmitter, based on available credits for transmission, in order to allow the Transmitter to send a TLP to a specified Receiver. In support of this Transmitter gating function, an initialization procedure is required, wherein Receivers must initially advertise VC credit values that are equal to or greater than certain pre-specified values. The number of credits allocated to a Transmitter is initially set according to the buffer size and allocation policies of the Receiver. As a succession of TLP transmissions occur, a count is kept of the credits being consumed. Before transmitting a given TLP, the Transmitter gating function must determine if sufficient credits are available to permit transmission of the given TLP. If the intended Receiver does not have enough credits to receive the TLP, the Transmitter must block the transmission of the TLP, possibly stalling other TLPs that are using the same virtual channel. The Transmitter must follow prescribed ordering and deadlock avoidance rules, which require that certain types of TLPs must bypass other specific types of TLPs when the latter are blocked.

Additionally, the credit accounting procedure tracks the count of the total number of credits granted to a Transmitter since initialization. This count may be incremented, as the Receiver side Transaction Layer makes additional received buffer space available by processing received TLPs. It would be beneficial to provide a central control that continually receives all the credit count information pertaining to each Receiver in a PCIE fabric. The central control could process such information, to provide flow control management throughout the PCIE fabric.

SUMMARY OF THE INVENTION

The invention generally pertains to a method and apparatus wherein a central Credit Controller Entity (CCE) is connected to a PCIE fabric environment by means of several buses. Flow Control information sent to the CCE over two of the buses indicates the buffer storage capacity that is available at respective Receiver components in the PCIE fabric. The CCE processes the Flow Control information, to generate updates that are sent by a third bus to Transmitter components corresponding to the Receivers. In one useful embodiment, directed to a method of Flow Control management, the CCE provides a repository adapted to store credit count information that represents the available storage capacity of respective Receivers. Embodiments of the invention thus provide a centralized entity, to significantly enhance flexibility in managing Flow Control updates generated by a PCIE root complex or end point. It is anticipated that these embodiments will enable a user to selectively maximize throughput or RAM buffering output, or to minimize latency. The method further comprises routing further credit count information from a given Receiver to the CCE, for storage in the repository, following each of successive events that affect the storage capacity of the given Receiver. The CCE is operated to selectively process the credit count information stored in the repository, in order to generate an update credit count. The update credit count is then selectively sent to a given Transmitter, to enable the given Transmitter to send a transmission to the given Receiver. Embodiments of the invention thus provide a centralized entity, to significantly enhance flexibility in managing Flow Control updates generated by a PCIE root complex or end point. It is anticipated that these embodiments will tend to maximize throughput and RAM buffering output, and to minimize latency.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
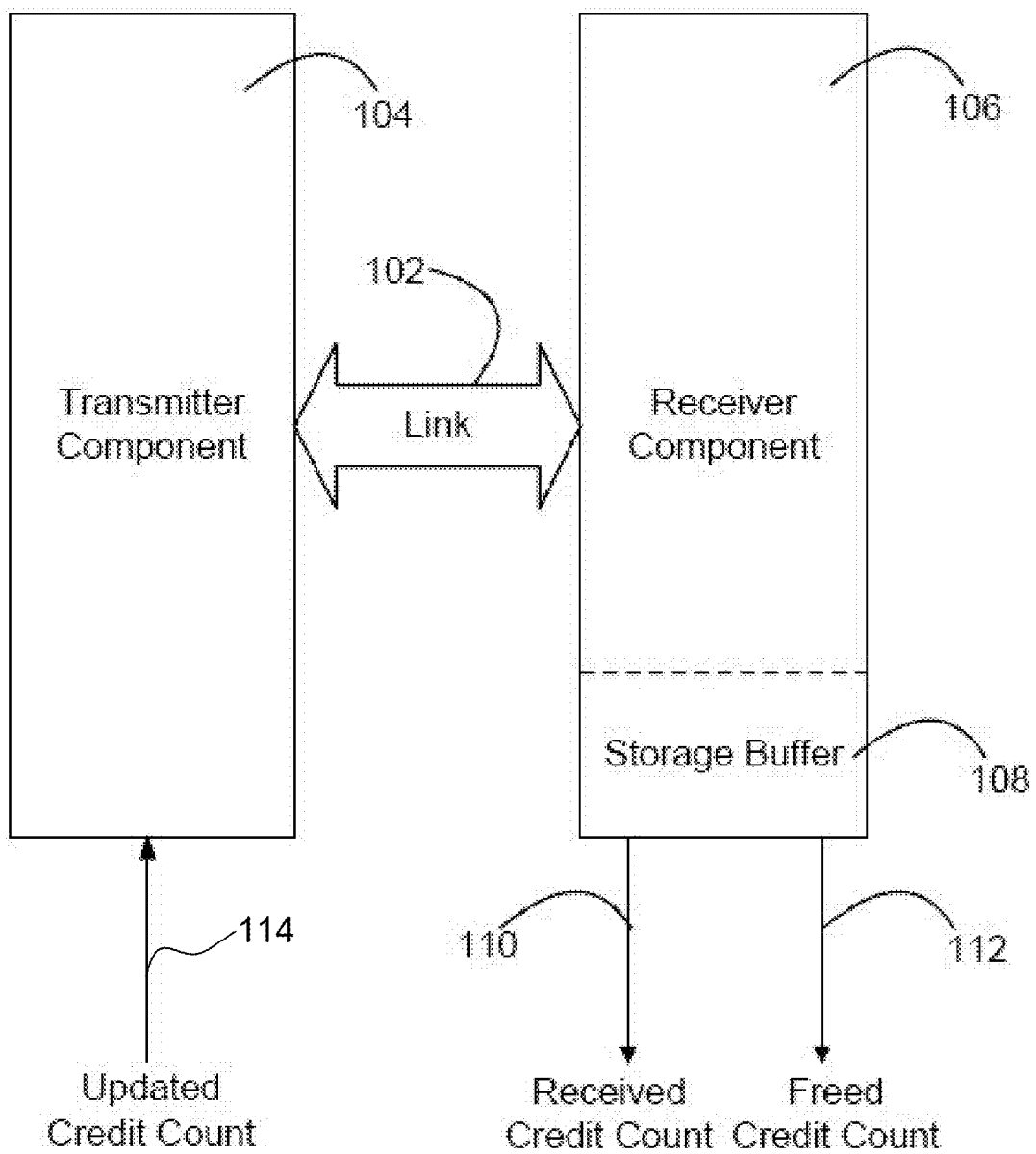
FIG. 1 is a schematic diagram showing Transmitter and Receiver components in a PCI-Express fabric that are joined together by a PCIE Link for transferring packets in accordance with an embodiment of the invention.

A PCI-Express (PCIE) fabric is composed of point-to-point links that interconnect a set of components. As an illustration, FIG. 1 shows a PCIE Link 102 between fabric components 104 and 106. In its most general form, a PCIE Link represents a dual-simplex communication channel between two components, and consists of two low voltage differential signal pairs, a transmit pair and a receive pair. However, for purposes of illustration, FIG. 1 shows component 104 designated to be a Transmitter component, and component 106 designated to be a Receiver component. It is to be understood that in some applications the roles of components 104 and 106 would be reversed. FIG. 1 further shows Receiver 106 provided with a storage buffer 108. While not shown, component 104 could have a similar storage buffer.

PCIE uses packets to communicate information between components. Packets are formed in the Transaction and Data Link Layers, to carry information from the transmitting component to the receiving component. In transmitting data from Transmitter 104 to Receiver 106 of FIG. 1, it will be readily appreciated that storage buffer 108 of Receiver 106 has an essential role. Thus, as discussed above, PCIE requires a Flow Control mechanism, in order to prevent overflow of buffer 108. The Flow Control mechanism also allows information packets to be transferred in accordance with prescribed PCIE ordering rules. Flow Control is handled by the Transaction Layer, in cooperation with the Data Link Layer.

In accordance with PCIE Flow Control procedures, Receiver 106 must initially advertise a virtual channel (VC) credit count value. The credit count value is a measure of the storage capacity of buffer 108, at any point in time, and the advertised credit count value can be no less than a specified minimum value, for a particular intended data transfer. More particularly, the advertised value cannot be less than a minimum value required by a PCIE standard or specification. One such standard is the PCI Express Base Specification, REV. 1.0a, hereinafter referred to as "PCIE Base Specification".

Following initialization, as successive Transaction Layer packets (TLPs) are received at Receiver 106, the storage capacity of buffer 108 is correspondingly reduced. Accordingly, for each received TLP, a Received Credit Count value 110 is provided by Receiver 106. Usefully, this value is in the form of a packet that includes an 8-bit header credit count and a 12-bit data credit count.

As the storage space of Receiver 106 is being diminished by received TLP transmissions, it is simultaneously also being increased, as the Transaction Layer of Receiver 106 makes additional received buffer space available by processing previously received TLPs. These increases, comprising Freed Credit Count values, offset the loss of buffer storage capacity that is caused by the receiving of TLPs. Accordingly, each time a previously received TLP is processed to add further space to buffer 108, Receiver 106 generates a Freed Credit Count value 112. In like manner with Received Credit Counts 110, each Freed Credit Count value 112 is usefully in the form of a packet that includes an 8-bit header credit count and a 12-bit data credit count.

In accordance with the invention, the available storage capacity in buffer 108, at a given time, will be indicated by both Received Credit Count values 110 and Freed Credit Count values 112 at the given time. Thus, both Received and Freed Credit Count values are continually routed to a Credit Controller Entity (CCE), as described hereafter in connection with FIG. 2. As also described, the CCE serves as a Transmitter gating mechanism by generating Update Credit Counts 114, that are successively routed to Transmitter 104. Each Update 114 causes Transmitter 104 to send a TLP to Receiver 106, through Link 102.

Figure 2:
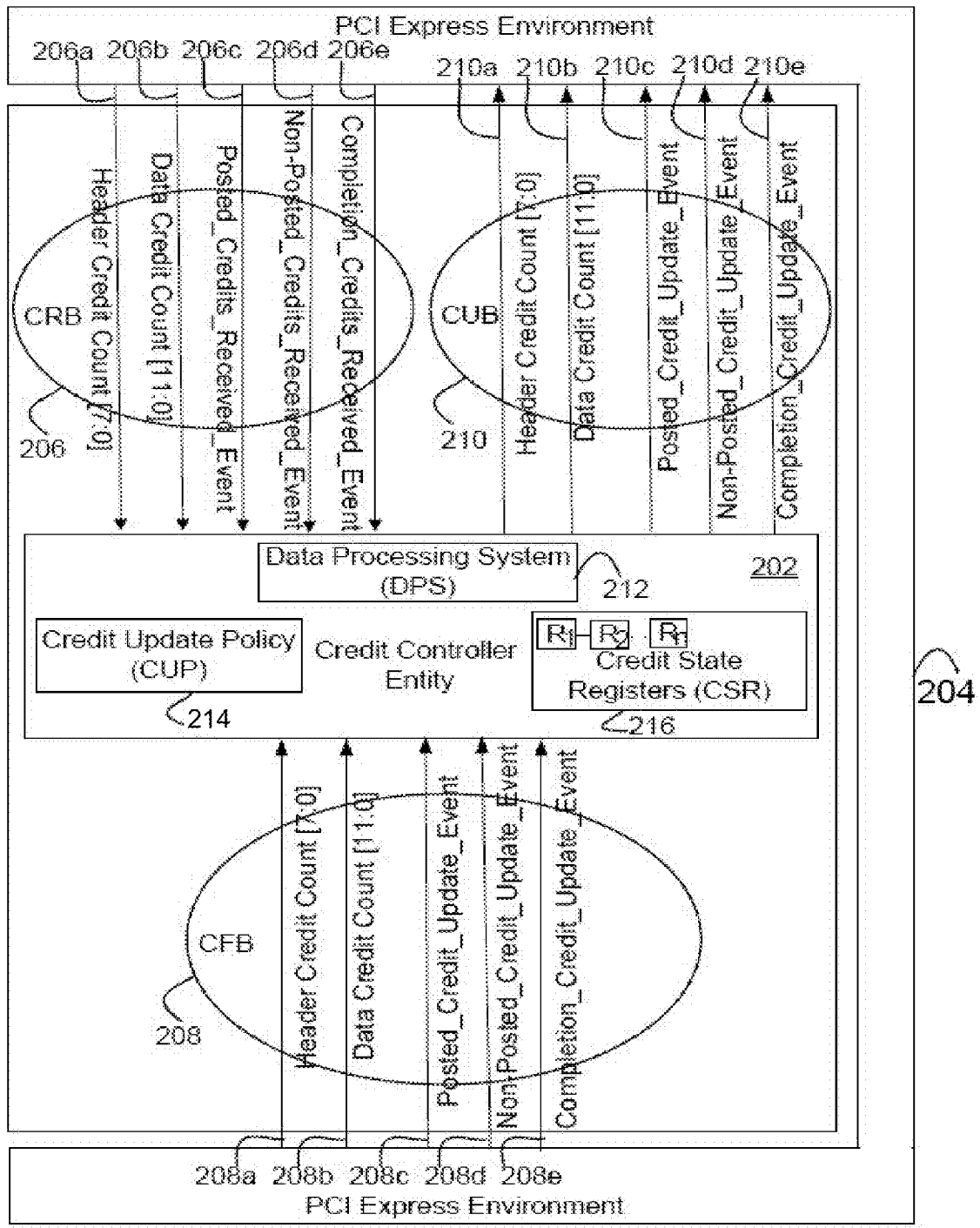
FIG. 2 is a block diagram showing an embodiment of the invention wherein a Credit Controller Entity (CCE) is connected to a PCIE fabric environment by means of buses.

Referring to FIG. 2, there is shown a Credit Controller Entity (CCE) 202 located proximate to PCIE Environment 204. Environment 204 comprises a PCIE fabric that contains a large number of Links 102, as well as components such as Transmitter 104 and Receiver 106. FIG. 2 shows CCE 202 coupled to the PCIE Environment 204 by means of several buses, including Credit Received Bus (CRB) 206, Credit Freed Bus (CFB) 208 and Credit Update Bus (CUB) 210. CCE 202 includes a Data Processing System 212, a Credit Update Policy (CUP) 214 and Credit State Registers (CSR) 216. Data Processing System 212 is connected to interact with other components of CCE 202, and could comprise, for example, the data processing system described hereinafter in connection with FIG. 3.

The bus CRB 206 is configured to route Received Credit Counts 110 from Receiver 106, as well as from other Receiver components contained in Environment 204, to CCE 202. Accordingly, CRB 206 comprises buses 206a and 206b, for carrying the 8-bit header credit count (7:0) and the 12-bit data credit count (11:0), respectively, of successive Received Credit Count values 110. Received Credit Count values are thus received from both Receiver 106 and other Receiver components of PCIE Environment 204. In addition, CRB 206 further comprises buses 206c-206e, for respectively routing three mutually exclusive Credit Received Event signals. These respectively comprise Posted_Credit_Received_Event, Non-Posted_Credit_Received_Event, and Completion_Credit_Received_Event signals.

When any of the Received Event signals is driven to a logic 1 value, the CC 202 interprets this to mean that the number of header credits appearing on the Header_Credit_Count bus 206a, and the number of data credits appearing on the Data_Credit_Count bus 206b, have been received. The CCE 202 will record this information in its Credit State Registers 216. However, if no Received Event signal is driven to a logic 1 value, the values on the Header_and Data_Credit_Count buses 206a and 206b are ignored by CCE 202.

Similar to CRB 206, bus CFB 208 is configured to route the Freed Credit Count values 112 from Receiver 106 and other Receiver components of Environment 204 to CCE 202. CFB 208 comprises buses 208a and 208b, for carrying the 8-bit header count (7:0) and the 12-bit data credit count (11:0), respectively, of successive Freed Credit Count values 112. Such Freed Credit Count values are received from both Receiver 106 and other Receiver components of PCIE Environment 204. In addition, CFB 208 further comprises buses 208c-208e, for respectively routing three mutually exclusive Credit Freed Event signals. These respectively comprise Posted_Credit_Freed_Event, Non-Posted_Credit_Freed_Event, and Completion_Credit_Freed_Event signals.

When any of the Freed Event signals is driven to a logic 1 value, CCE 202 interprets this to mean that the number of header credits appearing on the Header_Credit_Count bus 208a, and the number of data credits appearing on the Data_Credit_Count bus 208b, have been freed. The CCE 202 will record this information in its Credit State Registers 216. If no Freed Event signal is driven to a logic 1 value, the values on the Header_ and Data_Credit_Count buses 208a and 208b are ignored by the CCE 202.

CUB 210 likewise comprises an 8-bit Header Credit Count bus (7:0) 210a and a 12-bit Data Credit Count (11:0) bus 210b. CUB 210 further comprises buses 210c-210e, for respectively routing three mutually exclusive Credit Update Event signals. These are respectively Posted_Credit_Update_Event, Non-Posted_Credit_Update_Event, and Completion_Credit_Update_Event signals.

When CCE 202 drives any of the Update Event signals to a logic 1 value, this is to be interpreted by external components of PCIE Environment 204 as a directive to generate and transmit a PCIE Flow Control update DLLP. The CUB 210 is thus used to supply Updated Credit Counts 114, described above, to Transmitter 104. If no Update Event signal is driven to a logic 1 value, the values on the Header_ and the Data_Credit_Count buses 210a and 210b are to be ignored by Transmitter 104 and other external components of Environment 204.

Referring further to FIG. 2, CSR 216 is shown to comprise an array of registers, flip-flops or other storage elements $R_1$-$R_n$. These storage elements collectively store credit count information for each of the three events, as described above, that are associated with each of the buses 206, 208 and 210. For each such event, the last, or most recent, credit count is stored. Also for each event, the cumulative or running total of credit counts is stored. Thus, two items of information are stored for each event. Collectively, the registers of CSR 216 store the following items of information:

Header/Data Credit Count for last CUB Completion_Credit_Update_Event

Header/Data Credit Count for last CUB Posted_Credit_Update_Event

Header/Data Credit Count for last CUB Non-Posted_Credit_Update_Event

Header/Data Credit Count for last CRB Completion_Credit_Received_Event

Header/Data Credit Count for last CRB Posted_Credit_Received_Event

Header/Data Credit Count for last CRB Non-Posted_Credit_Received_Event

Header/Data Credit Count for last CFB Completion_Credit_Freed_Event

Header/Data Credit Count for last CFB Posted_Credit_Freed_Event

Header/Data Credit Count for last CFB Posted_Credit_Freed_Event

Running total of Header/Data Credit Counts for all CUB Completion_Credit_Update_Event Running total of Header/Data Credit Counts for all CUB Posted_Credit_Update_Event Running total of Header/Data Credit Counts for all CUB Non-Posted_Credit_Update_Event Running total of Header/Data Credit Counts for all CRB Completion_Credit_Received_Events Running total of Header/Data Credit Counts for all CRB Posted_Credit_Received_Event Running total of Header/Data Credit Counts for all CRB Non-Posted_Credit_Update_Event Running total of Header/Data Credit Counts for all CFB Completion_Credit_Freed_Event Running total of Header/Data Credit Counts for all CFB Posted_Credit_Freed_Event Running total of Header/Data Credit Counts for all CFB Posted_Credit_Freed_Event The CUP 214 is a component wherein an algorithm is implemented by means of a finite state machine, a microcontroller or the like, in order to control CUB 210. CUP 214 is disposed to receive credit count information from CSR 216, as well as from the buses CRB 206 and CFB 208. Moreover, the algorithm is configured to ensure that CCE 202 operates in accordance with requirements of PCIE standards, such as the PCIE Base Specification. Thus, CUP 214 and other elements of CCE 202 interact to manage Flow Control, among the external components of Environment 204, so that Flow Control is in compliance with the PCIE Base Specification. As an example, CUP 214 will receive Received Credit Count values 110 and Freed Credit Count values 112 from Receiver 106. By selectively processing these values, CUP 214 can determine whether or not buffer 108 has enough storage space to allow transmission of a TLP from Transmitter 104. If buffer 108 has sufficient storage capacity, an Update Credit Count 114 is sent to Transmitter 104 from CCE 202, enabling the transmission to take place.

Figure 3:
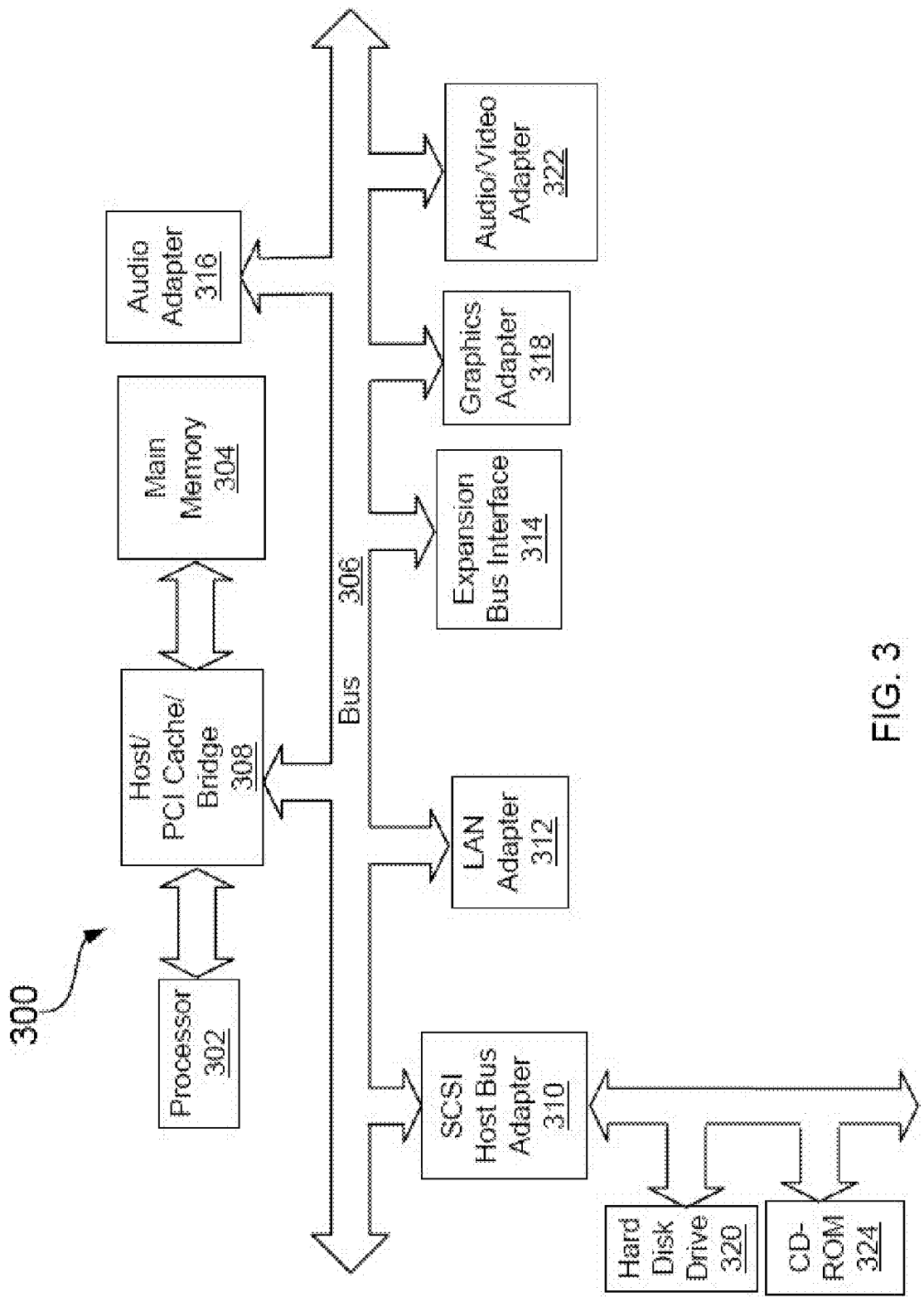
FIG. 3 is a block diagram showing a data processing system of a type that may be used in implementing the Transmitter of FIG. 1, the Receiver of FIG. 1, and/or the CCE of FIG. 2.

Referring to FIG. 3, there is shown a block diagram of a generalized data processing system 300 which may be used in implementing embodiments of the present invention. Data processing system 300 exemplifies a computer, in which code or instructions for implementing the processes of the present invention may be located. Data processing system 300 usefully employs a peripheral component interconnect (PCI) local bus architecture, although other bus architectures may alternatively be used. FIG. 3 shows a processor 302 and main memory 304 connected to a PCI local bus 306 through a Host/PCI bridge 308. PCI bridge 308 also may include an integrated memory controller and cache memory for processor 302.

Referring further to FIG. 3, there is shown a local area network (LAN) adapter 312, a small computer system interface (SCSI) host bus adapter 310, and an expansion bus interface 314 respectively connected to PCI local bus 306 by direct component connection. Audio adapter 316, a graphics adapter 318, and audio/video adapter 322 are connected to PCI local bus 306 by means of add-in boards inserted into expansion slots. SCSI host bus adapter 310 provides a connection for hard disk drive 320, and also for CD-ROM drive 324.

An operating system runs on processor 302 and is used to coordinate and provide control of various components within data processing system 300 shown in FIG. 3. The operating system may be a commercially available operating system such as a WINDOWS XP operating system, which is available from MICROSOFT Corporation. Instructions for the operating system and for applications or programs are located on storage devices, such as hard disk drive 320, and may be loaded into main memory 304 for execution by processor 302. Main memory 304 and hard disk drive 320 each comprises a computer readable medium for such instructions.

Figure 4:
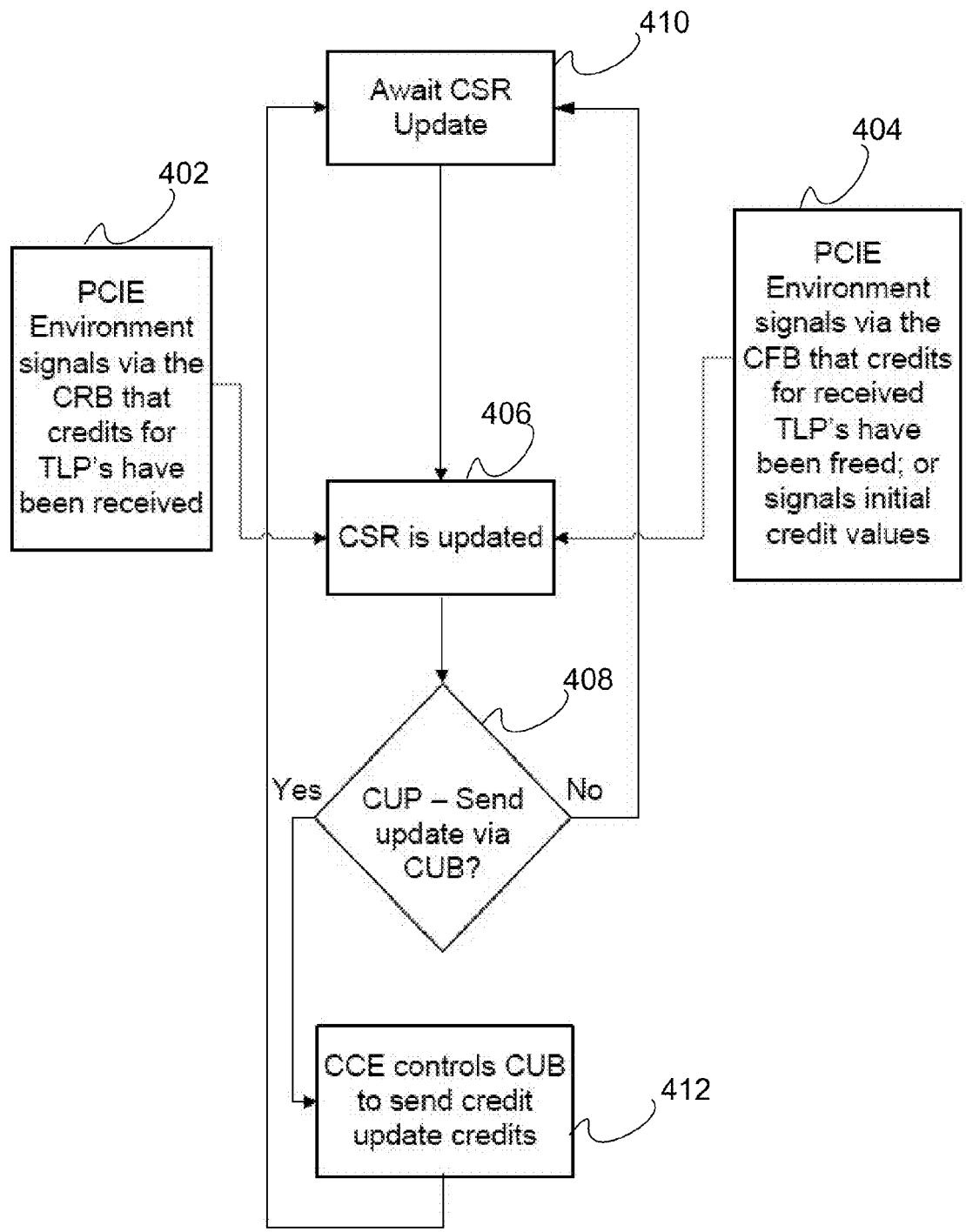
FIG. 4 is a flow chart showing respective steps for implementing the embodiment of FIG. 2.

Referring to FIG. 4, there is shown a flow chart depicting steps in the general operation of CCE 202. Function block 402 indicates that PCIE Environment 204 signals via CRB 206 that credits for TLPs have been received. Similarly, function block 404 indicates that Environment 204 signals via CFB 208 that credits for received TLPs have been freed. Alternatively, Environment 204 signals that initial credit values have been advertised by a Receiver component. Function block 406 shows that when either of these events occurs, CSR 216 is updated. Thereupon, CUP 214 must decide whether or not to send an update by means of CUB 210, as described above. This is indicated by decision block 408. If the CUP decides not to send an update, CCE 202 goes to a mode of waiting for the next CSR update, as indicated by function block 410. If the CUP decides to send an update, CCE 202 operates CUB 210 to send the update credits, as shown by function 212. Thereafter, CCE 202 goes to a mode of waiting for the next CSR update.

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed is:

1. In a PCI Express (PCIE) Environment containing components that include Receivers and Transmitters of Transaction Layer Packets (TLPs), a method of Flow Control management comprising the steps of:
   providing a Credit Controller Entity (CCE) for the Environment with a repository for storing credit count information that represents an available storage capacity of respective Receivers, wherein said repository comprises an array of credit state registers;
   routing credit count information from a storage buffer contained in a given Receiver to said repository of said CCE, for storage in said registers of said repository after each event of a succession of events that affect the storage capacity of said given Receiver, said events including one or more processing events that each increases storage capacity at said given Receiver, and further including one or more receiving events that each reduces storage capacity at said given Receiver;
   generating a Freed Credit Count value corresponding to each processing event, wherein each Freed Credit Count value comprises the increase in receiver capacity caused by its corresponding processing event;
   routing each Freed Credit Count value from an output of said storage buffer to said repository for storage in one or more registers of said array;
   generating a Received Credit Count value corresponding to each receiving event, wherein each Received Credit Count value comprises the reduction in receiver capacity caused by its corresponding receiving event;
   routing each Received Credit Count value from an output of said storage buffer to said repository for storage in one or more registers of said array;
   including said Freed Credit Count values and said Received Credit Count values in said routed credit count information;
   operating said CCE at a given time to use all of said credit count information stored in said registers of said repository, including each of said stored Freed Credit Count values and each of said stored Received Credit Count values, to determine the available storage capacity of said storage buffer in said given Receiver at the given time, and to generate an update credit count;
   selectively sending said update credit count to a given Transmitter, to enable said given Transmitter to send a transmission to said given Receiver, wherein said update credit count is sent to said given Transmitter, by means of a Credit Update Bus (CUB), to enable transmission of a particular Flow Control packet;
   said CCE selectively includes a Credit Update Policy for processing credit count information pertaining to each of said credit received and credit freed events, in order to generate said update credit count; and
   said credit received event information comprises a succession of received header and received data credit counts respectively routed to said CCE by means of a Credit Received Bus (CRB), and said credit freed event information similarly comprises freed header and freed data credit counts, respectively routed to said CCE by means of a Credit Freed Bus (CFB).

2. The method of claim 1, wherein:
   said Credit Update Policy implements a selected algorithm to control said CUB.

3. The method of claim 2, wherein:
   said CCE includes a data processing system for use in implementing said algorithm.

4. The method of claim 3, wherein:
   said CRB, said CFB and said CUB each carries signals indicating respective posted credit, non-posted credit, and completion credit events.

5. The method of claim 4, wherein:
   each of said header credit counts and data credit counts comprises a specified number of bits.

6. In a PCI Express (PCIE) Environment containing components that include Receivers and Transmitters of Transaction Layer Packets (TLPs), a computer program product in a computer readable medium for managing Flow Control comprising:
   instructions for operating a repository, that is contained in a Credit Controller Entity (CCE), to store credit count information that represents an available storage capacity of respective Receivers wherein said repository comprises an array of credit state registers;
   instructions for routing credit count information from a storage buffer contained in a given Receiver to said repository of said CCE, for storage in said registers of said repository after each of a succession of events that affect the storage capacity of said given Receiver, said events including one or more processing events that and at least one receiving event, each increases storage capacity at said given Receiver, and further including one or more receiving events that each reduces storage capacity at said given Receiver;
   instructions for generating a Freed Credit Count value corresponding to each processing event, wherein each Freed Credit count value comprises the increase in receiver capacity caused by its corresponding processing event;
   instructions for routing each Freed Credit Count value from an output of said storage buffer to said repository for storage in one or more registers of said array;
   instructions for generating a Received Credit Count value corresponding to each receiving event, wherein each Received Credit Count value comprises the reduction in receiver capacity caused by its corresponding receiving event;
   instructions for routing each Received Credit Count value from an output of said storage buffer to said repository for storage in one or more registers of said array;
   instructions for including said Freed Credit Count values and said Received Credit Count values in said routed credit count information;
   instructions for operating said CCE at a given time to use all of said credit count information stored in said registers of said repository, including each of said stored Freed Credit Count values and each of said stored Received Credit Count values, to determine the available storage capacity of said storage buffer in said given Receiver at the given time; and to generate an update credit count;
   instructions for selectively sending said update credit count to a given Transmitter, to cause said given Transmitter to send a transmission to said given Receiver, wherein said update credit count is sent to said given Transmitter, by means of a Credit Update Bus (CUB), to enable transmission of a particular Flow Control packet;

said CCE selectively includes a Credit Update Policy for processing credit count information pertaining to each of said credit received and credit freed events, in order to generate said update credit count; and said credit received event information comprises a succession of received header and received data credit counts respectively routed to said CCE by means of a Credit Received Bus (CRB), and said freed event information similarly comprises freed header and freed data credit counts, respectively routed to said CCE by means of a Credit Freed Bus (CFB).

7. The computer program product of claim 6, wherein:
said Credit Update Policy implements a selected algorithm to control said CUB.

8. The computer program product of claim 7, wherein:
said CCE includes a data processing system for use in implementing said algorithm.

9. The computer program product of claim 8, wherein:
said CRB, said CFB and said CUB each carries signals indicating respective posted credit, non-posted credit, and completion credit events.

10. In a PCI Express (PCIE) Environment containing components that include Receivers and Transmitters of Transaction Layer Packets (TLPs), Flow Control management apparatus comprising:

a Credit Controller Entity (CCE) for the Environment having a repository for storing credit count information that represents an available storage capacity of respective Receivers wherein said repository comprises an array of credit state registers;

a storage buffer means contained in a given Receiver;

bus means for routing credit count information from said storage buffer means to said repository of said CCE for storage in said registers of said repository after each event of a succession of events that affect the storage capacity of said given Receiver, said events including one or more processing events that each increases storage capacity at said given Receiver, and further includes one or more receiving events that each reduces storage capacity at said given Receiver;

said storage buffer means comprises means for generating a Free Credit Count value corresponding to each processing event, wherein each Freed Credit count value comprises the increase in receiver capacity caused by its corresponding processing event, and further comprises means for generating a Received Credit Count value corresponding to each receiving event, wherein each Received Credit Count value comprises the reduction in receiver capacity caused by its corresponding receiving event, wherein said Freed Credit Count values and said Received Credit Count values are both included in said routed credit count information;

said bus means comprises means for routing each Freed Credit Count value from an output of said storage buffer to said repository for storage in one or more registers of said array, and for routing each Received Credit Count value from an output of said storage buffer to said repository for storage in one or more registers of said array, wherein said Freed Credit Count values and said Received Credit Count values are included in said routed credit count information;

a Credit Update Policy at said CCE for processing all of said credit count information stored in said registers of said repository, including each of said stored Freed Credit Count values and each of said stored Received Credit Count values, to determine the available storage capacity of said storage buffer means in said given Receiver at the given time, and to generate an update credit count that is selectively sent to a given Transmitter, to cause said given Transmitter to send a transmission to said given Receiver, wherein said update credit count is sent to said given Transmitter, by means of a Credit Update Bus (CUB), to enable transmission of a particular Flow Control packet;

said CCE selectively includes a Credit Update Policy for processing credit count information pertaining to each of said credit received and credit freed events, in order to generate said update credit count; and said credit received event information comprises a succession of received header and received data credit counts respectively routed to said Credit Controller Entity by means of a Credit Received Bus (CRB), and said freed event information similarly comprises freed header and freed data credit counts, respectively routed to said Credit Controller Entity by means of a Credit Freed Bus (CFB).

11. The apparatus of claim 10, wherein:
said Credit Update Policy implements a selected algorithm to control said CUB.

12. The apparatus of claim 11, wherein:
said CCE includes a data processing system for use in implementing said algorithm.

13. The apparatus of claim 12, wherein:
said CRB, said CFB and said CUB each carries signals indicating respective posted credit, non-posted credit, and completion credit events.

* * * * *